United States Patent
Ruppert et al.

(10) Patent No.: US 11,123,170 B2
(45) Date of Patent: Sep. 21, 2021

(54) METHOD FOR PRODUCING LARGE POLYMERISED DENTAL MATERIAL BLOCKS

(71) Applicant: KULZER GMBH, Hanau (DE)

(72) Inventors: Klaus Ruppert, Maintal (DE); Alfred Hohmann, Schmitten (DE)

(73) Assignee: KULZER GMBH, Hanau (DE)

( * ) Notice: Subject to any disclaimer, the term of this patent is extended or adjusted under 35 U.S.C. 154(b) by 571 days.

(21) Appl. No.: 16/061,419

(22) PCT Filed: Dec. 14, 2016

(86) PCT No.: PCT/EP2016/080875
§ 371 (c)(1),
(2) Date: Jun. 12, 2018

(87) PCT Pub. No.: WO2017/102776
PCT Pub. Date: Jun. 22, 2017

(65) Prior Publication Data
US 2020/0261196 A1      Aug. 20, 2020

(30) Foreign Application Priority Data

Dec. 15, 2015 (DE) .................... 10 2015 121 858.5

(51) Int. Cl.
*A61C 13/14* (2006.01)
*A61C 13/15* (2006.01)
(Continued)

(52) U.S. Cl.
CPC ........ *A61C 19/003* (2013.01); *A61C 13/0022* (2013.01); *A61C 13/14* (2013.01);
(Continued)

(58) Field of Classification Search
CPC ... A61C 19/003; A61C 13/0022; A61C 13/14; B29C 35/0888; B29C 39/405; B29C 2035/0827
See application file for complete search history.

(56) References Cited

U.S. PATENT DOCUMENTS 6,669,875 B2    12/2003  Meyerholen et al.
7,214,435 B2     5/2007  Meyertholen et al.
(Continued)

FOREIGN PATENT DOCUMENTS

DE      699 22 413 T2    11/2005
DE      601 30 139 T2     5/2008
EP       2 586 399 A1     5/2013

*Primary Examiner* — Alison L Hindenlang
*Assistant Examiner* — Adrien J Bernard
(74) *Attorney, Agent, or Firm* — Norris McLaughlin, P.A.

(57) ABSTRACT

Methods produce a three-dimensional dental block of material from a dental, polymerizable material. The methods include at least: transferring the polymerizable dental material into a radiolucent three-dimensional casting or press mold; irradiating the polymerizable dental material substantially from all sides with light in the UV/Vis spectral region forming polymerized outer surfaces of the dental material in the form of a solid outer shell of the dental material, wherein the shell is present in the defined three-dimensional geometry of the material whilst the inner region of the material is not polymerized or partially polymerized; heating the material with solid shell being present in defined three-dimensional geometry, to 60° C. to 150° C. for at least 90 minutes; and obtaining a dental, polymerized block of material having defined three-dimensional geometry.

15 Claims, 3 Drawing Sheets

Figure 1:
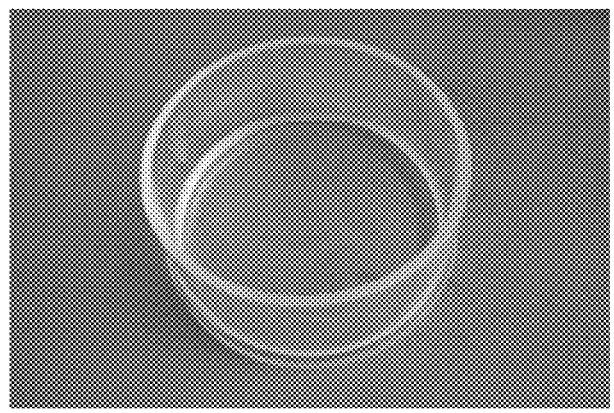

(51) Int. Cl.
  *A61C 13/00* (2006.01)
  *B29C 35/08* (2006.01)
  *B29C 39/40* (2006.01)

(52) U.S. Cl.
  CPC ........ *B29C 35/0888* (2013.01); *B29C 39/405* (2013.01); *B29C 2035/0827* (2013.01); *B29C 2791/009* (2013.01); *B29K 2833/12* (2013.01); *B29K 2869/00* (2013.01)

(56) References Cited

U.S. PATENT DOCUMENTS

| | | |
|---|---|---|
| 7,255,562 B2 | 8/2007 | Rusin et al. |
| 7,845,947 B2 | 12/2010 | Rusin et al. |
| 8,317,516 B2 | 11/2012 | Rusin et al. |
| 2002/0074675 A1 | 6/2002 | Meyertholen et al. |
| 2002/0090525 A1 | 6/2002 | Rusin et al. |
| 2003/0157357 A1 | 8/2003 | Rusin et al. |
| 2004/0067383 A1 | 4/2004 | Meyertholen et al. |
| 2007/0269768 A1 | 11/2007 | Rusin et al. |
| 2009/0297458 A1* | 12/2009 | Ruppert .............. A61K 6/30 424/49 |
| 2011/0006447 A1* | 1/2011 | Hara .............. B29C 35/0888 264/1.36 |
| 2011/0045436 A1 | 2/2011 | Rusin et al. |
| 2011/0115132 A1* | 5/2011 | Burdzy .............. B29C 39/006 264/478 |
| 2012/0315023 A1* | 12/2012 | Collins .............. B29C 35/10 392/411 |
| 2013/0049241 A1 | 2/2013 | Tsujimoto |
| 2014/0302459 A1* | 10/2014 | Wang .............. A61C 8/006 433/201.1 |
| 2015/0097315 A1* | 4/2015 | DeSimone .............. B33Y 50/02 264/401 |
| 2015/0306792 A1* | 10/2015 | Miyazawa .............. B29C 35/0888 264/496 |
| 2017/0209245 A1* | 7/2017 | Yang .............. A61C 19/003 |

\* cited by examiner

METHOD FOR PRODUCING LARGE POLYMERISED DENTAL MATERIAL BLOCKS

This application is a 371 of International Patent Application No. PCT/EP2016/080875, filed Dec. 14, 2016, which claims foreign priority benefit under 35 U.S.C. § 119 of the German Patent Application No. 10 2015 121 858.5, filed Dec. 15, 2015, the disclosures of which are incorporated herein by reference.

A subject matter of the invention is a method for tension-free polymerising of larger three-dimensional dental blocks of material, being suitable for the production of dental prosthetic parts in a material-removing process, wherein the method comprises the steps of transferring the polymerisable dental material into a radiolucent three-dimensional casting or press mould forming a defined three-dimensional geometry of the material, optionally: planarising at least one surface of the dental material in the three-dimensional casting or press mould and/or application of pressure to the polymerisable material in the three-dimensional casting or press mould, irradiating the polymerisable dental material substantially from all sides with light in the UV/Vis spectral region forming polymerised outer surfaces of the dental material in the form of a solid outer shell of the dental material, wherein the shell is present in the defined three-dimensional geometry of the material whilst the inner region of the material is not polymerised or partially polymerised, optionally removing the dental material with dimensionally stable shell having defined three-dimensional geometry from the casting or press mold, heating the material with solid shell and defined three-dimensional geometry to 60° C. to 150° C. for at least 90 minutes, and obtaining a dental block of material being substantially free from blowholes and being obtained substantially maintaining the three-dimensional geometry set prior to polymerisation, in particular the substantially complete polymerisation.

The state of the art discloses small mall blocks of material having a base of 1 cm² and a length of approximately 3 to 4 cm, which are cured for a few seconds on the two longitudinal sides. Alternatively, light curing in a water bath over a longer period is disclosed.

In the production of composite milling discs from highly filled composites, such as e.g. *Charisma*, Venus Diamond, Signum Ceramis or Venus Pearl, being light-curing, it is expected that cracks and fissures often occur in the case of mere hot curing due to tensions in the material, in particular when producing blocks of a certain size. Light curing is out of the question to the great layer thickness of the milling blank and the insufficient curing depth of the light-curing composite.

It was an object of the invention to develop a method allowing the production of dental blocks of material or plates of material, respectively, of a certain dimension which may be split or cut in a multitude of small blocks of material, from which dental prostheses or parts thereof may be produced by means of a material-removing, e.g. cutting, process. Likewise, a method should be developed with which substantially tension-free dental blocks of material may be produced, preferably being free from tension-induced defects, such as cracks. In addition, a method for the production of dental prosthetic composite milling blanks, in particular having a filler content of 50 to 95% by weight, should be developed, in which tension-induced defects, such as e.g. blowholes, cracks or fissures in the milling blank do not occur during the production process.

The objects were solved with a method according to claim 1 as well as with the dental blocks of material obtainable according to the method according to claim 11.

According to the invention, the objects were solved by giving a polymerisable dental material, such as preferably a dental composite, into a casting or press mould being translucent at the wave length of the photoinitiator/photoinitiators, and curing in a combined method of specific light-induced polymerisation and a defined thermic polymerisation. Thereby, it is advantageous for the dental material, such as, for example, a composite, to be warmed to a temperature, at which the viscosity of the material is significantly reduced, prior to pouring it into the casting or press mould. In doing so, the dental material may better flow into the casting or press mould, as well as fill the mould more completely. The selected temperature must be below the temperature at which the thermally induced polymerisation starts. The selectable temperature for setting the viscosity is therefore dependent on the used thermal polymerisation initiator. When using e.g. dibenzoyl peroxide, the dental material may be processed at approx. maximum 60-65° C. over a period of max. 2 hours.

After flowing into the transparent three-dimensional casting or press mould, in particular into the hollow mould of the casting or press mould, planarising or flattening of, respectively, of the surface is made by careful pressing the surface with a planar stamp such that the material obtains a defined three-dimensional geometry. Subsequently, the polymerisable material may be irradiated in the transparent casting or press mould for 6 min from all sides by a suitable light source, such as a laboratory light, preferably in a light furnace, such as e.g. Egger light furnace. The material is superficially polymerised or cured, respectively, by irradiation with UV/Vis light. Light curing corresponds to a pre-curing process in which an outer polymerised closed shell forms in the dental material. The polymerised, cured shell of the dental material has a thickness of polymerised material of approximately 3 to 5 mm. However, the core of the dental material is still soft. Subsequently, the dental material with closed outer shell is preferably removed from the mould. In a next step, the dental material, in particular the composite material, is thermally polymerised for approximately 8 hours in a furnace, such as a drying chamber, at approx. 90° C. to finish the thermal curing and thus the through-curing of the milling block. Preferably, the block of material obtainable is completely polymerised.

Object of the invention is a method for the production of a three-dimensional dental block of material, in particular of a dental composite block, from a dental, polymerisable material, as well as a block of material obtainable according to the method, wherein the block of material is suitable for the production of dental prosthetic parts in a material removing, e.g. cutting, process, and the method comprises the steps of a) optionally: setting the viscosity, in particular to obtain a flowable material, b) transferring the polymerisable dental material into a radiolucent three-dimensional casting or press mould, in particular with hollow mould, in particular into a PMMA or polycarbonate casting or press mould, preferably having a wall thickness of at least 5 mm to 30 mm, preferably of 5 to 10 mm wall thickness, and preferably forming a defined three-dimensional geometry of the material, c) optionally: planarising at least one surface of the dental material in the three-dimensional casting or press mould, in particular in a one-side open mould, forming a defined three-dimensional geometry of the material, and/or d) application of pressure to the polymerisable material in the three-dimensional casting or press mould, in particular the material is applied with a gas or gas mixture having a pressure of 1.5 to 5 bar, e) irradiating the polymerisable dental material from all sides with light in the UV/Vis spectral region, in particular the material is concurrently irradiated from all sides with light, forming polymerised outer surfaces of the dental material in the form of a solid outer shell of the dental material, wherein the shell is present in the defined three-dimensional geometry of the material, in particular of step b) or c), whilst the inner region of the material is not polymerised or partially polymerised, f) optionally removing the dental material with dimensionally stable shell having defined three-dimensional geometry from the casting or press mould, g) heating the material with solid shell being present in defined three-dimensional geometry, to 60° C. to 110° C. or at least 90 minutes, in particular at 70 to 95° C. for 6 to 10 hours, h) optionally cooling the completely polymerised material, i) obtaining a dental, polymerised block of material having defined three-dimensional geometry. Preferably, the polymerised block of material is completely polymerised.

In this context, the dental material may preferably contain 0.01 to 2% by weight of initiators comprising photoinitiators and at least one thermally activatable radical initiator, such as at least one peroxide.

In step b), the polymerisable dental material is preferably transferred into a radiolucent tree-dimensional casting or press mould, wherein the casting or press mould preferably has at least a first edge length or a diameter of greater than or equal to 90 mm and at least a second and/or third edge length of greater than or equal to 20 mm of the mould for the production of the block of material, moulds of at least 148×210 mm, preferably of at least 210×297 mm, and for the production of a material thickness/height of at least 20 mm, preferably 30 mm, 90 to 200 mm, are preferred.

In step e), the light source and/or the casting or press mould may rotate to enable uniform irradiation of the mould from all sides. The irradiation in step e) may preferably be made without separate cooling in a medium, such as water. Preferably, irradiation is concurrently made from all sides for at least 5 minutes to 60 minutes, preferably irradiation is concurrently made from all sides for 5 to 15 minutes. Due to the pre-treatment according to the invention, crack-free exposing without concurrent cooling may be made. The shell obtained in step e) usually has a wall thickness of 3 to 5 mm, such that the shell is present in a defined three-dimensional geometry of the material after irradiation in step e), whilst the inner region of the material is not polymerised or partially polymerised. Preferably, in step e), a dimensionally stable dental material with shell in defined three-dimensional geometry is obtained.

The blocks of material according to the invention shall be easily cuttable as well as suitable for the production of dental prosthetic parts in a material-removing/cutting process, such as a milling process and/or grinding, drilling, a material ablation by means of laser energy, such as laser milling, by means of chipping of the material, and/or CAD/CAM milling and/or a process comprising different cutting process steps. In this context, it is particularly preferred for the material-removing processes to be CAD/CAM processes in which the material-removing processing is made automatedly.

In order to transfer the blocks of material into an optimal geometry prior to polymerisation, planarising the polymerisable material transferred into the one-side open casting or press mould on the open, in particular upper side, was proved to be advantageous. Therefore, in step c) planarising is made by depositing a foil or a planar disc, both preferably being transparent, onto the material to be polymerised in the one-side open three-dimensional casting or press mould. The foil or the disc are subsequently applied with a stamp under pressure for planarising of the surface. The stamp with which the planarization is made is preferably pressed onto the material with a pressure of at least 1 bar, preferably under a pressure of 1.2 to 5 bar, further preferably, the planarization is made by means of a stamp at a pressure of 2 to 5 bar. For this purpose, the stamp preferably has a geometry side adjusted to the casting or press mould with planar bottom.

For homogenising the dental polymerisable material prior to the light-induced polymerisation, the material is applied with a gas or gas mixture under pressure. Appropriately, in step d), it is preferred for the polymerisable material to be applied with a pressure, in particular of a gas or gas mixture, of 1.5 to 5 bar, a pressure of 2 to 5 bar is preferred, particularly preferred of 2 to 3 bar. The polymerisable material is treated with a gas or gas mixture under elevated pressure to minimize or remove existing gaseous microinclusions in the material, e.g. from air or gas. Preferred gas or gas mixture for treatment of the material under pressure comprise air, helium and argon, wherein air is particularly preferred.

According to a particularly preferred embodiment of the invention, irradiation of the polymerisable dental material is substantially made from all sides with light in the UV/Vis spectral region in the range of approx. 380 nm-500 nm, preferably as dual irradiation in the UV and Vis spectral region, preferably irradiation is concurrently made from all sides of the three-dimensional geometry, for a period greater than or equal to 4 minutes to 4 hours, in particular greater than or equal to 5 minutes, 5.5 minutes to 15 minutes are preferred.

Another subject matter of the invention is a method, in which irradiation of the polymerisable dental material is made as dual irradiation and the at least two intensity maxima of the light of the radiation source(s) are in the UV and in the Vis spectral region, in particular an irradiation is made with intensity maxima of the radiation source(s) of 350 nm to 390 nm and of 420 nm to 500 nm, preferably with intensity maxima about 380 nm to 450 nm, preferably +1-20 nm. Dual irradiation is particularly suited to obtain a qualitatively particularly good and uniform polymerisation of the outer shell. In this context, it is further particularly preferred for the irradiation to be made in a light furnace, in particular in an insidely mirrored light furnace, particularly preferred in a light furnace having two to 20 radiation sources, preferably 4 to 15 radiation sources with at least two intensity maximal of the radiation source(s) of 350 nm to 390 nm and of 420 nm to 500 nm, particularly preferably with intensity maxima about 380 nm to 450 nm. Particularly preferred radiation sources in an insidely mirrored light furnace are: 2-20 radiation sources each having 9 W (450 nm) as well as 2 to 20 radiation sources each having 9 W (380 nm).

Due to the irradiation in step e), preferably an outer, closed shell of the polymerised material in the three-dimensional geometry of the dental material is formed. The dental material with shell preferably is dimensionally stable and has a defined three-dimensional geometry approximately corresponding to the casting or press mould. Preferably, the shell has a thickness of greater than or equal to 2 to 15 mm, preferably the shell has a thickness of polymerised material of greater than or equal to 2 to 10 mm, particularly preferably of 3 to 6 mm, further preferably of 3 to 4 mm.

In a method step, e.g. f), the dental material with dimensionally stable shell and having defined three-dimensional geometry is preferably removed from the casting or press mould. According to an alternative, the subsequent thermal treatment may also be made in the casting or press mould.

In a method step, e.g. j), the dental, polymerised block of material obtained in i) having defined three-dimensional geometry is divided into greater than or equal to 50 milling blocks each having at least one edge length of greater than or equal to 10 mm, in particular to less than or equal to 25 mm, preferably to less than or equal to 20 mm. Preferably, two to three edge lengths of the cuboid milling blocks are greater than or equal to 10 mm. Dividing may be made by cutting, laser cutting, sawing or other measures known by the person skilled in the art. In this context, it is particularly preferred for the block of material to be divided into greater than or equal to 90 milling blocks, preferably greater than or equal to 160 milling blocks each having at least one edge length of greater than or equal to 10 mm, and in particular less than or equal to 20 mm, preferably less than or equal to 25 mm. The milling blocks are preferably present in the form of cuboids. Preferably, all edge length of the cuboids are greater than or equal to 10 mm, in particular greater than or equal to 12 mm, and less than or equal to 25 mm. Like this, milling blanks in the form of cuboids having a face of 14×14 mm, or of 15×15 mm as well as a height of 17 to 18 mm may be produced.

In method step g), the material from step e) with solid shell and defined three-dimensional geometry is heated to 60° C. to 150° C. for at least 90 minutes. Preferably, the thermal polymerisation is performed in a temperature range of 70° C. to 100° C., preferably of 70 to 95° C., particularly preferably of 80° C. to 95° C., further preferably of 85 to 95° C., preferably about 90° C.+/−2.5° C. The thermal polymerisation is performed in the aforementioned temperature range for greater than or equal to 2 hours, preferably for 2 to 12 hours. In particular, to 70° C. to 95° C. for 2 to 12 hours. In order to produce particularly tension-free blocks of material, in particular blocks of material having one edge length of greater than or equal to 90 mm and at least one second edge length of greater than or equal to 20 mm, a thermal treatment of 80 to 95° C. for 5 to 12 was proved, in particular over 7 to 9 hours, preferably about 8 hours at 90° C.+/−2.5° C. According to a particularly preferred alternative, in step g), heating to 70° C. to 95° C. for 2 to 12 hours is made, in particular the dental material is heated in a furnace in step g).

Following the thermal polymerisation step, in step h), the material may cool in the furnace over a defined time. In this context, for the production of particularly tension-free blocks of material, it is preferred for the cooling to be made in the furnace, which is switched off after performing step g). Preferably, the furnace is switched off and the material may slowly cool in the furnace.

The block of material according to the invention preferably has a flexural strength of greater than or equal to 140 MPa, preferably greater than or equal to 145 MPa, and an E-modulus of greater than or equal to 10,000 MPa, preferably greater than or equal to 10,500 MPa, preferably greater than or equal to 11,000 MPa, at the same time.

Optional setting of the viscosity prior to transferring of the dental polymerisable material into the casting or press mould may be made by warming the material to 60 to 65° C. Optional setting of the viscosity may be made by warming the material to 60 to 65° C., in particular by warming the polymerisable material to a temperature in the range of 35° C. to approximately 10° C. below the dissociation temperature of thermal radical initiators.

However, in each case, the temperature for adjusting the viscosity shall be below the temperature at which the thermally induced polymerisation is started. Preferably, the temperature is at least 10° C. below the temperature at which the thermally induced polymerisation starts.

The dental material may preferably the following viscosity or may be set to a following viscosity with $\eta$ of $1 \cdot 10^2$ Pa·s to $5.0 \cdot 10^5$ Pa·s, in particular of $8 \cdot 10^2$ Pa·s to $4.5 \cdot 10^5$ Pa·s. Thereby, the dynamic modulus of the polymerisable material may be between $G^*=2 \cdot 10^3$ to $5 \cdot 10^6$.

A viscosity of $1 \cdot 10^5$ Pa·s to $5.0 \cdot 10^8$ Pa·s is alternatively preferred, a viscosity n of $5 \cdot 10^5$ Pas to $2.0 \cdot 10^8$ Pas is preferred, particularly preferred $\eta$ of $8 \cdot 10^5$ Pas to $2.0 \cdot 10^8$ Pa·s. Thereby, the dynamic modulus of the polymerisable material may be between $G^*=2 \cdot 10^3$ to $10 \cdot 10^5$. The viscosity is determined by an oscillation measurement. The amplitude sweep is measured (device: Anton Paar NCR301).

Casting or press moulds, in particular having a hollow mould, made of PMMA (polymethylmethacrylate) or polycarbonate (PC) are used for the production of the blocks of material according to the invention. For this purpose, the moulds may be cylindrical, above one-side open PMMA casting or press moulds, in particular having a hollow mould, having a PMMA bottom, e.g. in the form of cylindrical bowl made of PMMA. The moulds may also have rectangular or quadratic dimensions in the top view. For example, casting or press moulds are suitable having at least one hollow mould, which is present in the form of a cuboid, in which two faces are greater than or equal to DIN A5, in particular greater than or equal to DIN A4, and the remaining edge length amounts to at least 20 mm, preferably greater than or equal to 30 mm, greater than or equal to 40 mm 50 mm, greater than or equal to 60 mm. The production of cuboids in which at least four faces are greater than or equal to DIN A5, in particular greater than or equal to DIN A4, is likewise possible. Cylindrical, rodlike or cubical geometries are also suitable geometries for the hollow mould in casting or press moulds. Alternatively, the casting or press mould may be produced from another transparent material as polycarbonate.

In this context, the hollow mould may preferably correspond to the three-dimensional defined geometry of the shell having defined three-dimensional geometry of the material, preferably to the geometry of the dental, polymerisable block of material having defined three-dimensional geometry. In this context, it is particularly preferred for the block of material having defined three-dimensional geometry to have a volume shrinkage of less than or equal to 1-3% by volume, based on at least on edge length of the hollow mould.

Particularly preferably, the method is performed with casting or press moulds having a transparency of greater than 95%, in particular made of PMMA or polycarbonate or even glass, such as quartz glass or customary glass. According to a particularly preferred alternative, the method according to the invention is performed with casting or press moulds, the material of which has a refractive index of 1.3 to 1.8, in particular of 1.48 to 1.50.

An alternative casting or press mould may comprise an inner casting or press mould made of PMMA or polycarbonate or even glass, such as quartz glass or customary glass, which may be stabilised on the outside by a scaffold having through holes. The scaffold may consist of a metal or an alloy.

The wall thickness of the casting or press moulds used in the method shall preferably be in the range of 5 to 30 mm, preferably of 5 to 10 mm. Preferably, irradiation is directly made in the PMMA or polycarbonate casting or press mould, in particular without the use of a water bath, without water cooling of the casting or press mould or any other cooling medium surrounding the casting or press mould.

According to the method according to the invention, blocks of material having defined three-dimensional geometry may be produced or are obtainable, respectively, which substantially do not have any gaseous micro-inclusions or blowholes being larger than 0.05 mm, preferably the blowholes or gaseous micro-inclusions are less than or equal to 100 µm, particularly preferably less than or equal to 50 µm, further preferably less than or equal to 20 µm.

The polymerised blocks of material produced or obtainable according to the method according to the invention having defined three-dimensional geometry preferably have at least one first edge length or a diameter of greater than or equal to 90 mm and preferably have at least one second edge length of greater than or equal to 20 mm, in particular greater than or equal to 90 mm to 200 mm. In particular, cuboids may be obtained in which two faces are larger than or equal to DIN A 5 (21 cm×14.8 cm) or greater than or equal to DIN A4 (21 cm×29.7 cm) and the remaining edge lengths amounts to greater than or equal to 20 mm, preferably greater than or equal to 30 mm, preferably greater than 40 to 60 mm.

In the method according to the invention, a composite material may be used as dental polymerisable material, which comprises (i) 50 to 95% by weight inorganic fillers comprising a) silicon dioxide, preferably silicic acid; zirconium dioxide and/or mixtures comprising at least the two aforementioned oxides, and b) dental glasses, the average particle size of the which is in the range of 0.2 to 10 µm, (ii) 5 to 50% by weight monomer mixture, (iii) 0 to 2% by weight initiators comprising photoinitiators, at least one thermally activatable radical initiator, in particular 0.01 to 1% by weight, such as peroxides, (iv) 0 to 2% by weight stabilisers, additives, wherein the total composition amounts to 100% by weight.

According to a preferred alternative, the dental glasses may be present with at least two different fractions of average particle sizes in the range of 0.2 to 10 µm.

Another subject matter of the invention is a dental block of material which does not have any blowholes, cracks or cavities having an extent in one dimension of greater than or equal to 0.05 mm, preferably they are less than or equal to 100 µm, particularly preferably less than or equal to 50 µm, further preferably less than or equal to 20 µm. Another subject matter of the invention is a block of material having at least one edge length or a diameter of greater than or equal to 90 mm and at least one edge length of greater than or equal to 20 mm. Blocks of material having 148×210 mm, preferably of 210×297 mm, and a material thickness/height of at least 20 mm, preferably 20 mm, 90 to 200 mm are preferred.

The polymerised block of material is further characterised by substantially having the same defined geometry as the polymerisable dental material in the casting or press mould, in particular in step c), d) and/or e), in particular in step c) or d). Thus, the polymerised block of material preferably has almost the same geometry as the recess of the casting or press mould, wherein the height of the block of material may vary on the side on which planarising was made.

Due to the long, preferably for at least 4 minutes concurrent from all sides, light curing according to the invention, the polymerisable dental material obtains a solid outer dimensionally stable shell which is already present in the defined three-dimensional geometry of the material. According to the invention, the dental material with the solid shell may thus be removed from the casting and/or press mould, and subsequently be thermally treated in the furnace.

Preferably, the polymerised block of material in relation to the polymerisable dental material in the defined geometry in step c) or d) has a shrinkage of less than 1-3% by volume, based on the first edge length or a diameter of 90 mm. A shrinkage of less than or equal to 1-3% by volume, based on the second edge length of greater than or equal to 20 mm, is also preferred.

Another subject matter of the invention is the use of a polymerised block of material having at least one edge length or a diameter of greater than or equal to 90 mm and at least one second edge length of greater than or equal to 20 mm for the production of at least two smaller blocks of material, in particular by dividing the block of material at least once, preferably by cutting, sawing or by dividing by other measures known by the person skilled in the art. In accordance with method of the invention, DIN A5 or even DIN A4 sized plates having a thickness of 10 to 50 mm, preferably of 20 to 50 mm may be produced, which then may be divided, for example, into milling blocks in the form of cuboids of a face 14×14 mm, or 15×15 mm as well as a height of 17 to 18 mm. Like this, more than 200 smaller blocks of material for use as milling blocks may be produced, e.g. more than 200 smaller blocks of material or milling blocks, respectively may be cut, from a DIN A4 sized plate.

The blocks of material produced according to the invention or the blocks of material producible from them may subsequently be processed in a material-removing/cutting process into dental prosthetic parts or parts thereof, in particular composite blocks may be produced and be processed in a CAD/CAM process by milling, drilling and/or by means of a laser ablation in a material-removing/cutting process, such as laser milling.

Exemplary embodiments clarify the invention without limiting the invention to these subject matters.

FIG. 1: A translucent PMMA casting or press mould according to the invention.

Figure 2:

FIG. 2: PMMA mould filled with polymerisable dental material.

Figure 3:
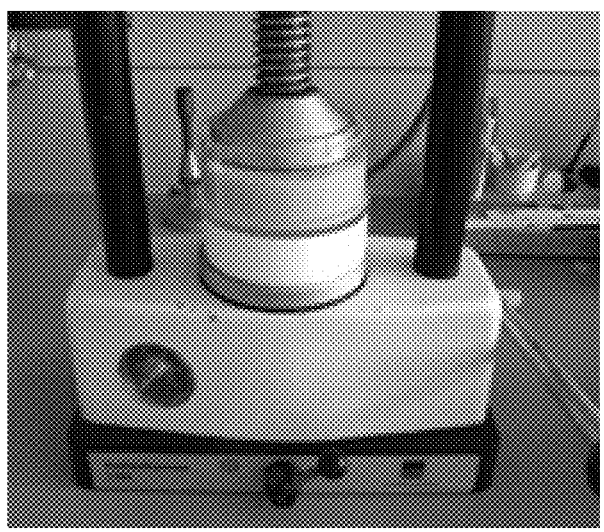

FIG. 3: Planarising the surface of the material.

Figure 4:
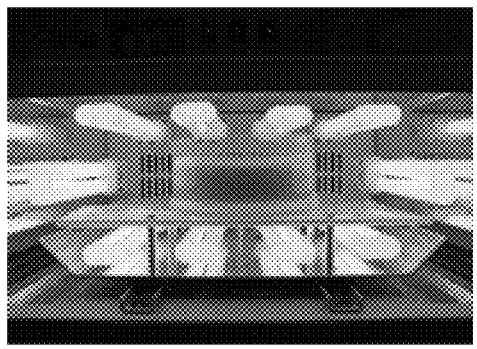

FIG. 4: All-sided light-curing forming the shell in the polymerisable material.

Figure 5:
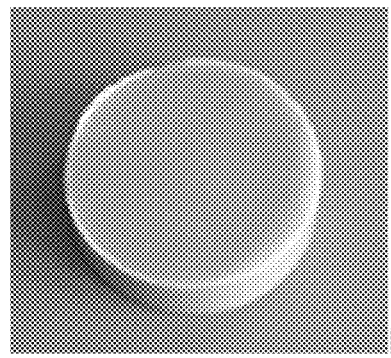

FIG. 5: Polymerised block of material.

Figure 6:
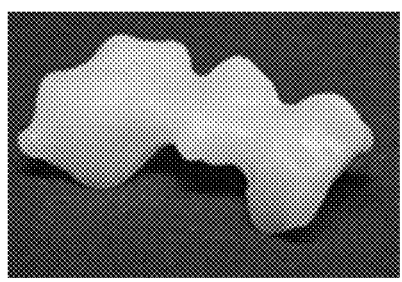

FIG. 6: Bridge milled from the block of material.

Figure 7A:
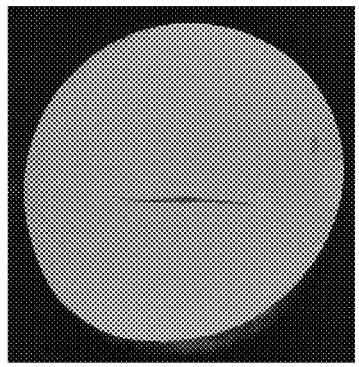
Figure 7B:
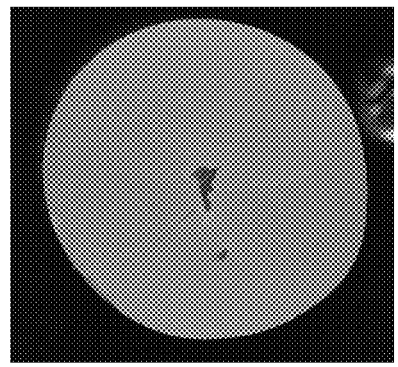
Figure 7C:
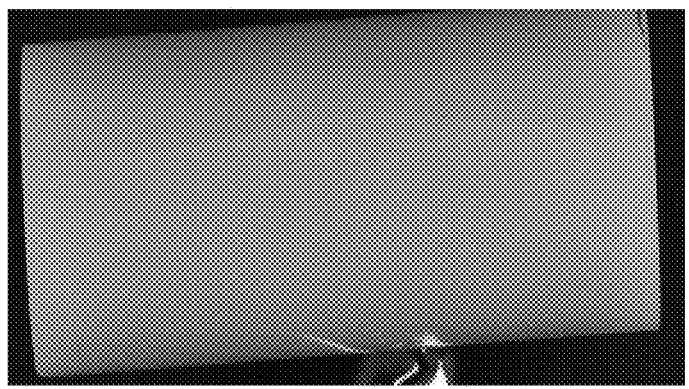

FIGS. 7*a*, 7*b* and 7*c*: Blocks of material, non-according to the invention, of the same material which was merely thermally cured.

Figure 8:
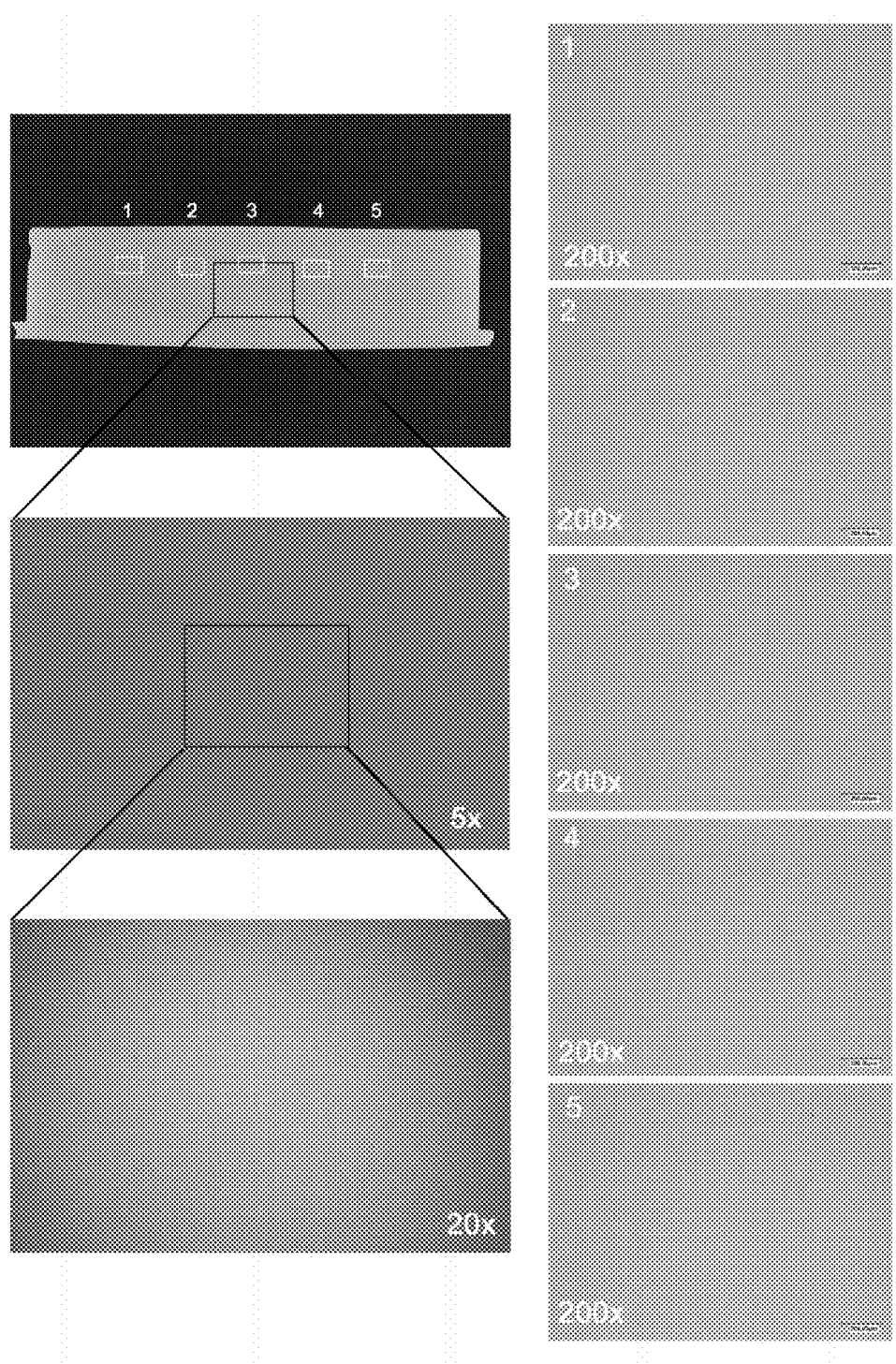

FIG. 8: View of a cut block of material according to the invention with different magnifications of the cutting surface.

FIG. 1 shows a PMMA casting or press mould according to the invention, being one-side opened above, to be able to flow in the dental material or to insert it as kneadable paste. In FIG. 2, the PMMA mould filled with a polymerisable dental material is shown. In FIG. 3, the dental material in the PMMA mould is planarised on the upper side with a stamp by pressing on the stamp with a defined pressure on the surface of the polymerisable material. Preferably, a transparent foil or a transparent planar pane, preferably made of PMMA, is located between the stamp and the surface of the polymerisable material. Subsequently, the material is applied in a pressure vessel with a gas or a gas mixture to remove gaseous micro-inclusions. The all-sided light curing is shown in FIG. 4. After light curing, the thermal polymerisation according to the invention is made at 90° C. for 8 hours. The polymerised block of material obtained is shown in FIG. 5 and in FIG. 6.

FIGS. 7a, 7b and 7c: Blocks of material non-according to the invention of the same material which was cured by tempering the material for 8 h at 90° C. The cured material has large cracks or blowholes of a size greater than 0.5 cm. Overall, it is also noticeable that the polymerised blocks of material do not have the original defined geometry after tempering but are strongly warped. In top view, it is easy recognisable that the blocks of material do no longer have the originally circular geometry. In FIG. 7c, the inner cracks extending up to the outer surface are recognisable.

FIG. 8 shows a cut block of material as well as different sections 1, 2, 3, 4 and 5 in 200× magnification as well as a larger section with 5× and 20× magnification. The scale for 200 micrometers is shown in FIGS. 1 to 5. The magnifications show that the block of material cured according to the method according to the invention do not show any warpings or gaseous inclusions despite its large dimension of more than 90 mm width, whilst the merely thermally cured blocks of the same dimensions are warpened and have large cracks and blowholes.

EXAMPLE

According to the invention, the object is solved by giving the composite into a casting or press mould being translucent at the wave length of the photoinitiator. Advantageously, the composite is previously warmed to a temperature, at which the viscosity of the material is significantly reduced, to enable better flowing into the mould. However, the temperature must still not so high that the thermally induced polymerisation starts. This depends on the used thermal polymerisation initiator. When using e.g. dibenzoyl peroxide, maximum temperatures of approx. 60-65° C. for a period of max. 2 hours proved to be appropriate.

After flowing into the transparent mould and planarising of the surface by careful pressing, the material is irradiated in the mould for 6 min from all sides in a suitable light furnace, such as e.g. Egger light furnace, and superficially cured. After this pre-curing process, the material is covered with a cured "skin" of approx. 5 mm, the core however is still soft. The dimensionally stable light-cured composite material is removed from the PMMA mould and is subsequently put into a drying chamber for approx. 8 hours at approx. 90° C. to finish the thermal curing and thus the through-curing of the milling block.

UV/Vis: 380 nm to 500 nm for 6 minutes, at 23° C. RT; 5 tubes Osram dulux S-Blue 71 blue 9 W (450 nm) and 5 tubes Osram dulux S-Blue 78 blue 9 W (380 nm), in particular in an insidely mirrored light furnace; thermal polymerisation: in preheated furnace at 90° C. for 8 hours. Cooling is made in the furnace being switched off.

Comparison of the Material Parameters

|  | test body produced from light curing paste Charisma | test body milled from milling block produced according to the invention Charisma + peroxide |
|---|---|---|
| flexural strenght [MPa] | 144 | 145 |
| E-modulus [MPa] | 9543 | 11747 |
| 8 min curing | 8 min double-sided Palatray CU | 6 min Egger light furnace and 8 h 90° C. drying chamber |

The respective test body variables meet the requirements of DIN 4049. Determination of the flexural strength [MPa] and of the E-modulus [MPa] was made according to DIN 4049.

The invention claimed is:

1. Method for the production of a three-dimensional dental block of material from a dental, polymerisable material, wherein the block of material is suitable for the production of dental prosthetic parts in a material-removing process, comprising the steps of
   a) optionally: setting the viscosity,
   b) transferring the polymerisable dental material into a radiolucent three-dimensional casting or press mould,
   c) optionally: planarising at least one surface of the dental material in the three-dimensional casting or press mould forming a defined three-dimensional geometry of the material, and/or
   d) optionally application of pressure to the polymerisable material in the three-dimensional casting or press mould,
   e) irradiating the polymerisable dental material substantially from all sides with light in the UV/Vis spectral region forming polymerised outer surfaces of the dental material in the form of a solid outer, closed shell of the dental material, wherein the shell is present in the defined three-dimensional geometry of the material whilst the inner region of the material is not polymerised,
   f) removing the dental material with dimensionally stable shell having defined three-dimensional geometry out of the casting or press mould,
   g) performing thermal polymerization by heating the material with solid shell being present in defined three-dimensional geometry, to 60° C. to 150° C. for at least 90 minutes,
   h) optionally: cooling the completely polymerised material,
   i) obtaining a dental, completely polymerised block of material having defined three-dimensional geometry.

2. Method according to claim 1, wherein
   I) the irradiation of the polymerisable dental material is made substantially from all sides with light in the UV/Vis spectral region for a period of greater than or equal to 4 minutes to 4 hours, in particular greater than or equal to 5 minutes, and/or
   II) the shell in step e) has a thickness of greater than or equal to 2 to 15 mm.

3. Method according to claim 1, wherein the irradiation of the polymerisable dental material is made as dual irradiation with intensity maxima of the light of the radiation source in the UV and Vis spectral region, in particular an irradiation is made with intensity maxima of the radiation source of 350 nm to 390 nm and of 420 to 500 nm.

4. Method according to claim 1, wherein the polymerisable dental material is transferred into a radiolucent, three-dimensional casting or press mould having a hollow mould, wherein the hollow mould has the form of a cuboid, in which two faces are greater than or equal to DIN A5 (21 cm×14.8 cm), in particular greater than or equal to DIN A4 (21 cm×29.7 cm), and the remaining edge length amounts to at least 20 mm.

5. Method according to claim 1, further comprising step a), wherein the setting of the viscosity is made by heating the material to 60 to 65° C.

6. Method according to claim 1, further comprising step c), wherein the planarising is made by depositing a transparent foil or a planar transparent pane onto the material to be polymerised in a one-side open three-dimensional casting or press mould, and the foil or the pane is subsequently applied with a stamp under pressure for planarising of the surface.

7. Method according to claim 1, further comprising step d), wherein the polymerisable material in the three-dimensional casting or press mould is applied with a pressure of 1.5 to 5 bar.

8. Method according to claim 1, wherein the dental, completely polymerised block of material having defined three-dimensional geometry
a) has at least one first edge length or a diameter of greater than or equal to 90 mm and at least a second edge length of greater than or equal to 20 mm, or
b) has the form of a cuboid in which two faces are greater than or equal to DIN A5, in particular greater than or equal to DIN A4, and the remaining edge length amounts to at least 20 mm.

9. Method according to claim 1, wherein the three-dimensional casting or press mould is made of polymethylmethacrylate.

10. Method according to claim 1, wherein the dental, completely polymerised block of material obtained having defined three-dimensional geometry is divided into greater than or equal to 50 milling blocks having at least one edge length of greater than or equal to 10 mm.

11. Block of material obtained according to claim 1.

12. Block of material according to claim 11, wherein the block of material does not have any blowholes, cracks or cavities having an extent in one dimension of greater than or equal to 0.05 mm.

13. Block of material according to claim 10, wherein at least one first edge length or a diameter of greater than or equal to 90 mm and at least one second edge length of greater than or equal to 20 mm.

14. Method of using a three-dimensional casting or press mould in the form of a hollow mould made of polymethylmethacrylate or polycarbonate for the production of a dental block of material cured by means of radiation and at increased temperature according to claim 1.

15. Method according to claim 14, wherein the radiation is UV/Vis radiation.

* * * * *